May 29, 1951 W. W. WELBORN 2,554,652
SELF-LUBRICATING WIND MOTOR
Filed Dec. 6, 1948 4 Sheets-Sheet 2

Inventor

Walter W. Welborn

By Clarence A. O'Brien
and Harvey B. Jacobson
Attorney

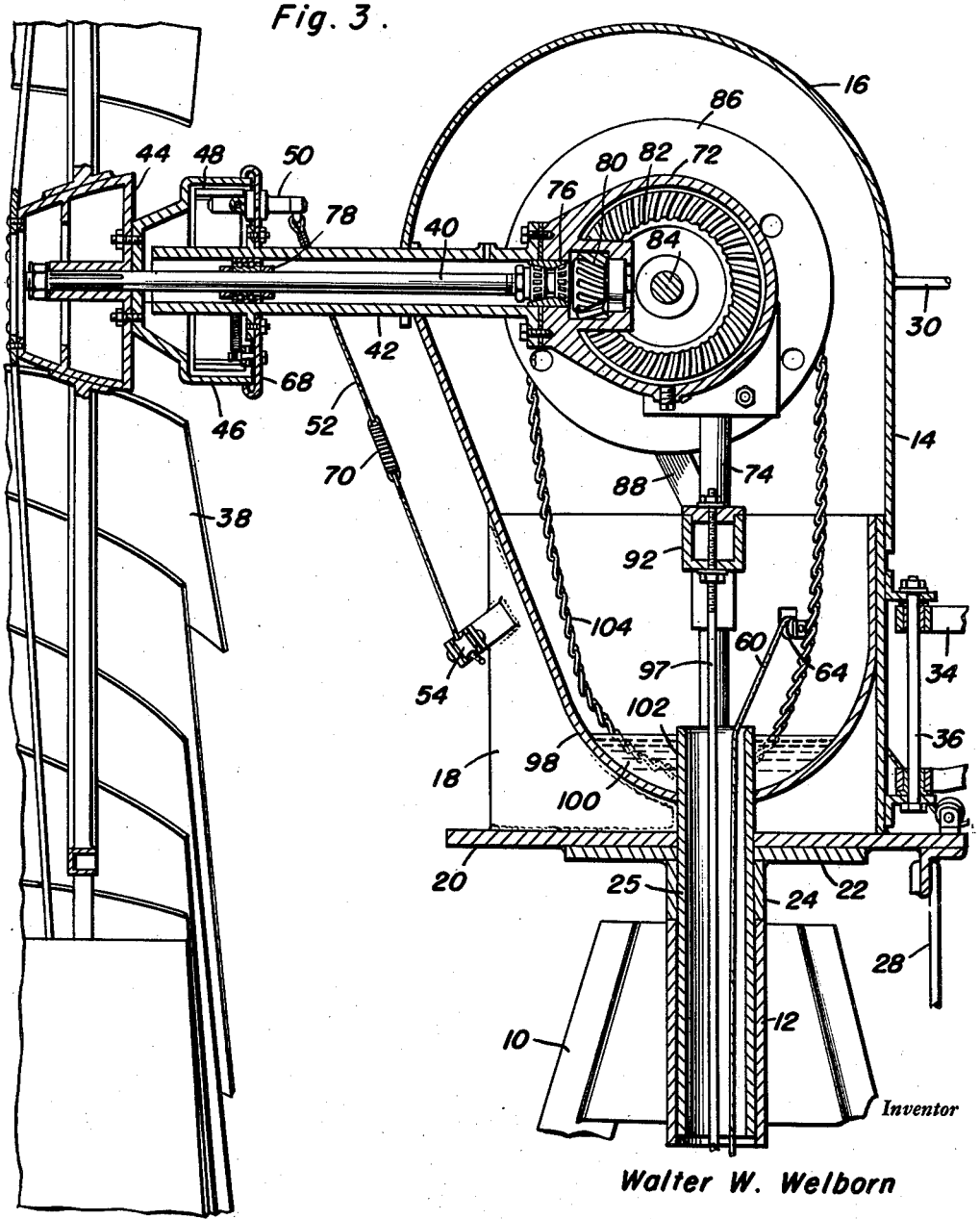

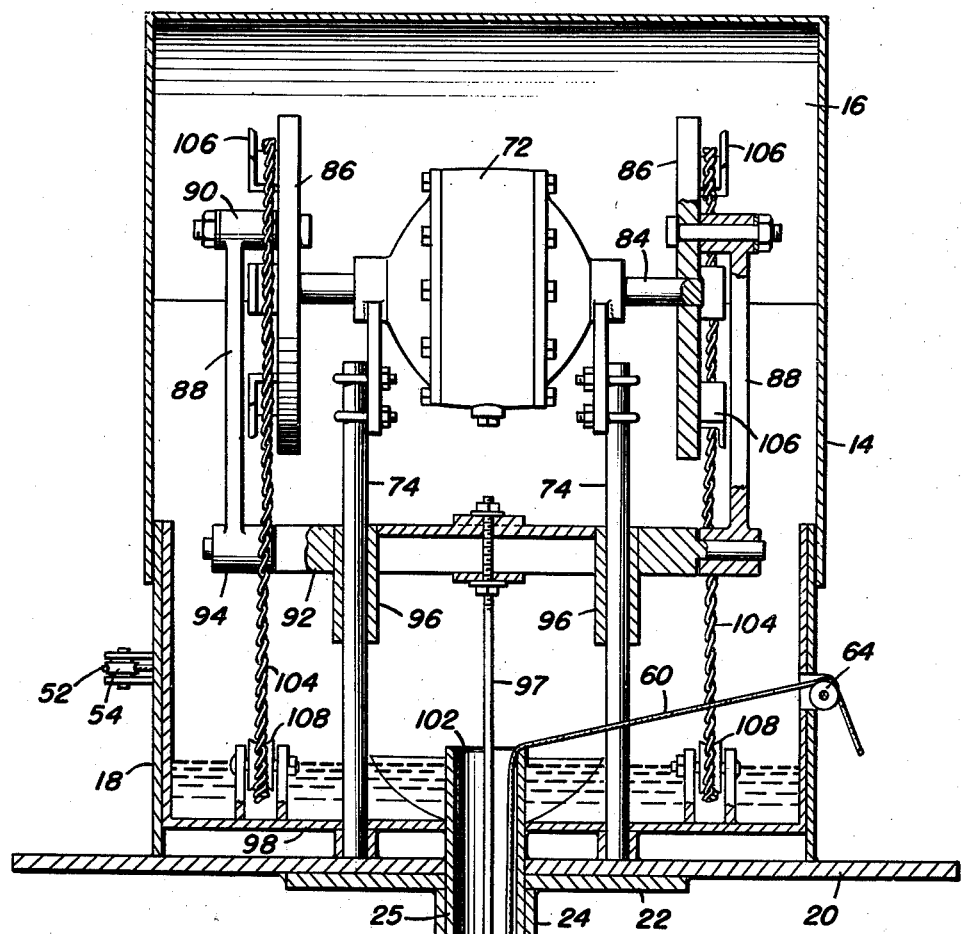
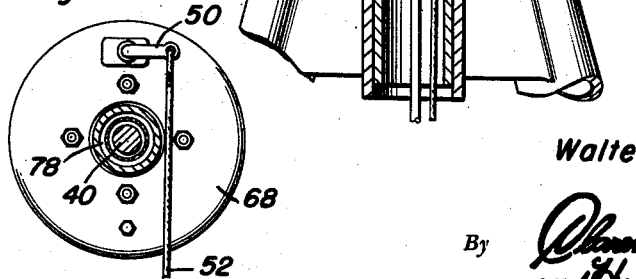

Patented May 29, 1951

2,554,652

UNITED STATES PATENT OFFICE 2,554,652

SELF-LUBRICATING WIND MOTOR

Walter W. Welborn, Carrizo Springs, Tex.

Application December 6, 1948, Serial No. 63,696

3 Claims. (Cl. 74—44)

This invention relates generally to windmills and more particularly to improved means for transmitting power from the wind wheel to a reciprocating piston, and means for controlling the operation of the wind wheel.

A primary object of this invention is to provide a wind motor of a character which will be exceedingly rugged and which can be constructed largely of lightweight fabricated steel, and which will require a minimum of maintenance and repair.

Another object of this invention is to provide a brake for the wind wheel which is automatically applied when the wind vane is moved to the position making the wind wheel inoperative, this brake positively preventing further rotation of the wind wheel until the wind vane is again oriented so as to turn the wind wheel into the wind.

Still another object of this invention is to provide the wind motor in which the driven piston is moved under power in both directions, thus avoiding a jerky uneven motion of the device which is to be driven by the windmill.

Yet another object of this invention is to provide a wind motor with improved means for self lubrication.

And a last object to be mentioned specifically is to provide a windmill construction which is relatively inexpensive and practicable to manufacture, which is simple, safe and convenient to operate, and which will give generally efficient and durable service.

With these objects definitely in view, this invention resides in certain novel features of construction, combinations and arrangement of elements and portions as will be hereinafter described in detail in the specification, particularly pointed out in the appended claims, and illustrated in the accompanying drawings which form a material part of this disclosure, and in which:

Figure 3 is a vertical sectional view, taken substantially upon the line 3—3 in Figure 2;

Figure 4 is a vertical sectional view, taken on the line 4—4 in Figure 1; and

Figure 5 is a vertical sectional view taken on the line 5—5 in Figure 1.

Similar characters of reference designate similar or identical elements and portions throughout the specification and throughout the different views in the drawings.

Figure 1:
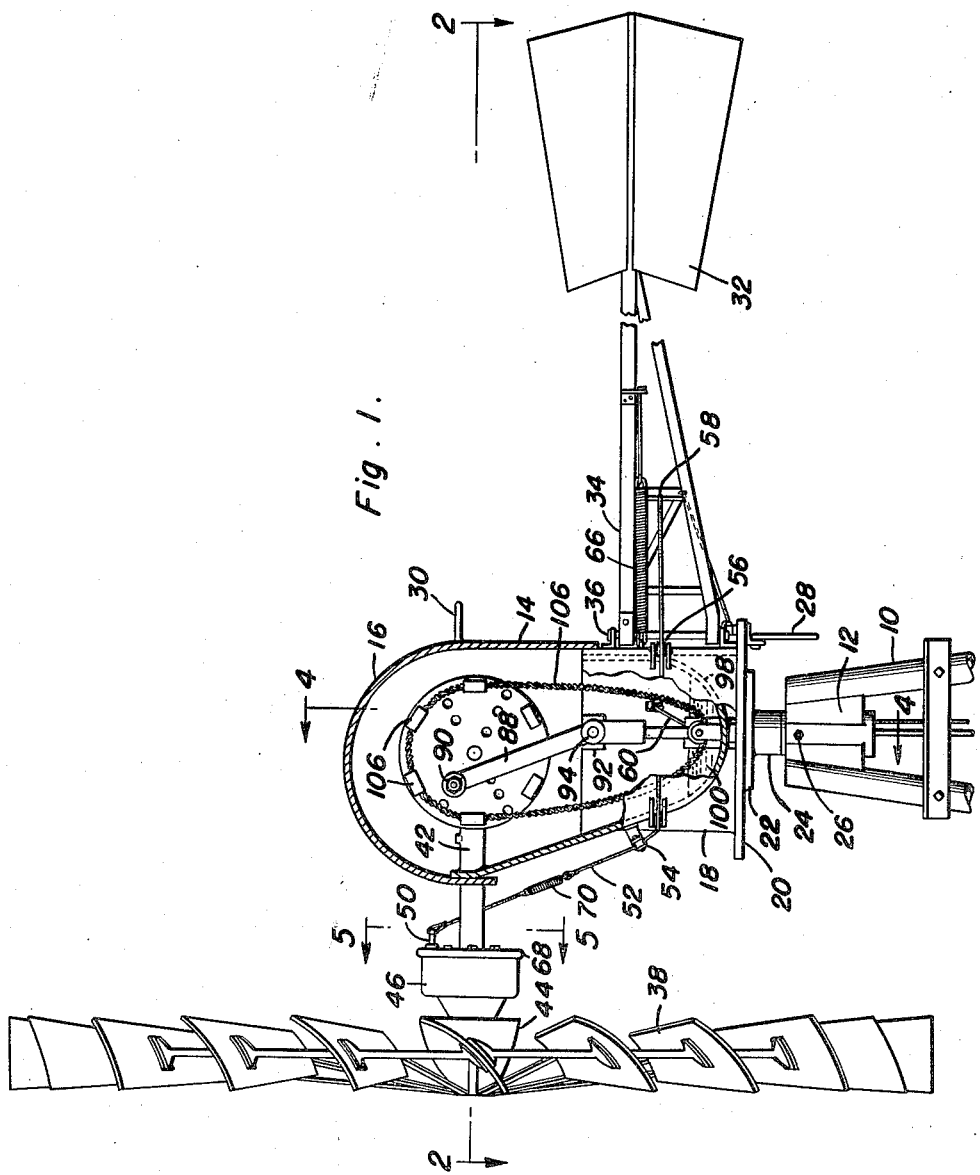
Figure 1 is a side elevational view of an upper portion of a windmill with this invention incorporated thereon, portions in the foreground of the figure being broken away and the underlying portions shown in vertical section and in elevation to amplify the disclosure.

Referring now to the drawings in detail, this improved windmill will include a normal complement of such parts as the derrick 10 or other similar support. At the upper end of the derrick there is provided a sleeve bearing 12 upon which is indirectly pivoted or swiveled the main casing 14, this case being of fabricated steel and preferably rectangular in cross section at any one horizontal plane, although the main casing will have a rounded top plate 16, a lower skirt portion 18, all rigidly secured together and carried by a platform 20 which is reinforced by a center plate 22. This reinforcing plate 22 has a depending annular collar 24 which seats upon the upper end of the sleeve bearing 12, while a cylindrical member 25, preferably hollow, is rigidly secured to the platform 20 and reinforcing plate 22, it being understood that the cylindrical member 25 depends axially into the sleeve bearing 12. Grease nipples 26 may be provided to facilitate lubrication of the cylindrical member 25 within the sleeve member 12.

A step 28 may be secured to the platform 20 and a hand hold 30 may be mounted upon the main casing 14. A wind vane of conventional design will be carried by an arm assembly 34 pivoted as at 36 on one side of the main casing 14. The wind wheel 38, also of conventional design, will be supported on an outer end portion of a wind wheel shaft 40 which is rotatably mounted within a wind wheel shaft casing 42 rigidly mounted upon the main casing 14, the wind wheel 38 having a hub 44 which will be splined or otherwise suitably secured on the outer end of the wind wheel shaft 40. A brake drum 46 will be rigidly mounted upon the hub 44 coaxially with the shaft 40 and brake shoes 48 will be operatively mounted within this brake drum. The details of construction of this portion of the invention are somewhat diagrammatically illustrated in Figure 3, and it will be understood that the type of brake drum and brake shoe assembly will be of the same general type as that used in wheels of automotive vehicles, a brake actuating lever 50 extending from the inner side of the said assembly for connection with a brake actuating cable 52. It should be here noted that the cable 52 is led around guide pulleys 54 and 56 for terminal connection as at 58 on the wind vane arm 34.

Figure 2:
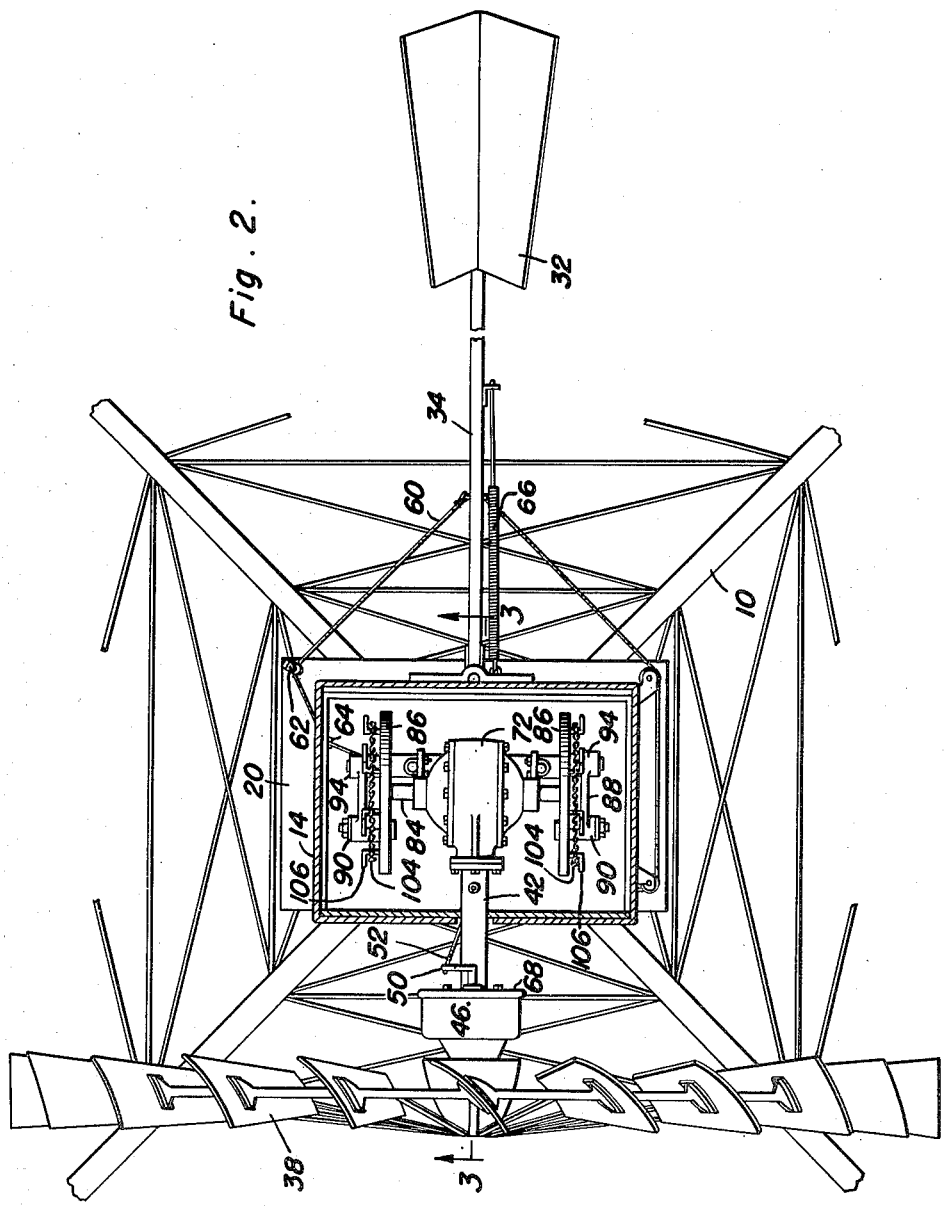
Figure 2 is a horizontal sectional view taken substantially upon the line 2—2 in Figure 1.

Another cable 60 is terminally secured to this same wind vane arm 34 and is entrained over pulleys 62, 64, and still other pulleys if necessary, and is led downwardly through the hollow cylindrical member 25 for connection to a crank or the like at the base of the derrick 10, this crank being not shown in the drawings since the same is of conventional character and is used in a conventional manner to pull the wind vane 32 in a direction anti-clockwise in Figure 2 in order to make the windmill inoperative. A strong helical spring 66 is terminally secured to the wind vane arm 34 and to the main casing 14 in a manner adapted to bias the wind vane into a position rendering the windmill operative, this construction being also of conventional nature. The foregoing will indicate how the wind wheel 38 is braked against rotation when the wind vane 32 is pulled by the cable 60 into a position rendering the windmill inoperative, thus positively preventing rotation of the wind wheel 38. In order to facilitate maintenance of the brake assembly, the brake drum 46 is closed on the side adjacent the main casing 14 by a removable back plate 68, it being preferred that the brake shoes and actuating lever 50 should be mounted upon this back plate. A safety feature may be incorporated with the brake actuating cable 52 comprising an extensible spring 70 secured intermediate the ends of the cable 52, so that when the brake is fully applied, further movement of the vane supporting arm 34 will merely extend the spring 70 and avoid injury to the brake mechanism.

A gear housing 72 is rigidly mounted upon the upper ends of two or more vertical cross head guide members 74, all within the main casing 14, and the lower ends of the members 74 being rigidly mounted upon the platform 20. The inner end of the wind wheel shaft 40 is mounted in a thrust bearing 76 carried by the gear housing 72 and another thrust bearing 78 will support an intermediate portion, near the outer end of the wind wheel shaft, the latter thrust bearing being mounted in the wind wheel shaft housing 42, as illustrated generally in Figure 3. The inner end of the shaft 40 carries a pinion 80 which meshes with a ring gear 82 on a crank shaft 84, the term "crank" being used to indicate that any suitable type of eccentric assembly may be used in place of the straight shaft 84 and the discs 86 which are rigidly secured to the outer end of this shaft 84. A pitman 88 is pivoted as at 90 on the outside of each of these discs 86, eccentrically thereof, so that the shaft 84 and discs 86 may be considered a crank shaft. Each pitman 88 is pivoted at its lower end to a cross head 92, the pivotal connection being indicated at 94 and this cross head having sleeve bearings 96 which are slidably associated with the cross head guide members 74. The cross head 92 is thus made reciprocable immediately above the hollow cylindrical member 25 and a piston rod 97 is secured to the cross head and extends downwardly through this hollow member 25 for connection to a pump or other device to be operated by the windmill.

The lower portion of the main casing 14 has an inner curved wall 98 to contain oil 100 and this oil bath is provided for lubricating the sleeve bearings 96 during the operation of the windmill. It will be understood that when the cross head 92 is in its lowermost position the sleeve bearings 96 will dip into the oil bath. This same oil is prevented from escape into the hollow cylindrical member 25 by extending this last mentioned member upwardly within the main casing as indicated at 102, and a pair of endless chains 104 are entrained over a plurality of angle brackets 106 carried on the outer sides of the discs 86, so that the chains are gradually shifted to carry oil upwardly so as to drip onto the pivoted ends 90 and 94 of each pitman 88 thus lubricating the same, and the lower ends of the chains 104 will be guided by pulleys 108 which are freely rotatably mounted on the curved wall 98.

The operation of this invention will be reasonably clearly understood from a consideration of the foregoing description of the mechanical details thereof, taken in connection with the drawings and with the above recited objects of this invention. It will be clear that all these objects are amply achieved by this invention and further description would appear unnecessary.

Obviously, minor variations from the embodiment set forth herein may be resorted to without departure from the spirit and scope of this invention and such scope should be determined only as limited by a proper interpretation of the sub-joined claims.

Having described the invention, what is claimed to be new is:

1. In a wind motor, a crosshead guide, a gear housing fixed on said guide, a crank shaft mounted in said gear housing and having a pair of cranks on opposite sides of said guide, and a pitman connecting each crank with said crosshead, said guide including a pair of vertical bars, said cross head having sleeve bearings slidably mounted on said bars, a casing enclosing said cross head and housing and having an oil bath, and said bearings entering the oil bath during an operational cycle.

2. A wind motor according to claim 1 and wherein said cranks are discs on the ends of said crank shaft, cleats on said discs, and endless chains carried by said cleats and dipping into said oil bath to lubricate each pitman.

3. A wind motor including a main casing having a base platform mounted for swivel movement on a support, vertical bars with their lower ends fixed to said platform and comprising a cross head guide, a gear housing mounted on the upper ends of said bars, a windwheel shaft rotatively mounted in said gear housing, a cross head mounted on said cross head guide, a crank shaft driven by said windwheel shaft and having cranks comprising discs on two opposite sides of said cross head guide, a pitman connected between each disc and said cross head, said main casing having an inner lower curved walled portion to contain lubricating oil, cleats on said discs, and endless chains carried by said cleats and dipping in said oil to lubricate each pitman.

WALTER W. WELBORN.

REFERENCES CITED

The following references are of record in the file of this patent:

UNITED STATES PATENTS

| Number | Name | Date |
|---|---|---|
| 748,998 | Stanley | Jan. 5, 1904 |
| 758,296 | Brett | Apr. 26, 1904 |
| 776,781 | Fletcher | Dec. 6, 1904 |
| 999,188 | Agre | Dec. 14, 1915 |
| 1,163,682 | Noyes | Dec. 14, 1915 |
| 1,205,896 | Hurst | Nov. 21, 1916 |
| 1,241,604 | Astrom | Oct. 2, 1917 |
| 1,555,349 | Ballow | Sept. 29, 1925 |
| 1,590,495 | Campion | June 29, 1926 |
| 1,620,145 | Turner | Mar. 8, 1927 |
| 1,626,203 | Macomber | Apr. 26, 1927 |
| 2,107,219 | Schenk | Feb. 1, 1938 |
| 2,112,900 | McColby | Apr. 5, 1938 |
| 2,307,622 | Edens | Jan. 5, 1943 |